(12) United States Patent
Dryden

(10) Patent No.: US 9,220,237 B1
(45) Date of Patent: Dec. 29, 2015

(54) QUIET VACUUM SYSTEM FOR GROOMING PETS

(71) Applicant: Jamie Dryden, Las Cruces, NM (US)

(72) Inventor: Jamie Dryden, Las Cruces, NM (US)

( * ) Notice: Subject to any disclaimer, the term of this patent is extended or adjusted under 35 U.S.C. 154(b) by 6 days.

(21) Appl. No.: 14/159,890

(22) Filed: Jan. 21, 2014

Related U.S. Application Data

(60) Provisional application No. 61/755,149, filed on Jan. 22, 2013.

(51) Int. Cl.
*A01K 13/00* (2006.01)
*A47L 9/00* (2006.01)

(52) U.S. Cl.
CPC .............. *A01K 13/001* (2013.01); *A47L 9/0081* (2013.01)

(58) Field of Classification Search
CPC ... A01K 13/00; A01K 13/001; A01K 13/002; A47L 7/009; A47L 7/0066; A47L 7/00
USPC ......... 119/600, 601, 606, 608, 609, 611, 612, 119/613, 614, 615, 616; 15/326, 327.1, 15/344, 398, 399, 400, 402, 414, 415.1
See application file for complete search history.

(56) References Cited

U.S. PATENT DOCUMENTS

| | | | |
|---|---|---|---|
| 1,770,749 A * | 7/1930 | Engberg et al. ............. 15/367 |
| 2,320,367 A * | 6/1943 | Leathers ................. 174/47 |
| 3,574,885 A * | 4/1971 | Jones ................... 15/393 |
| 4,799,460 A | 1/1989 | Kuhl | |
| 5,074,006 A | 12/1991 | Eremita | |
| 5,095,853 A * | 3/1992 | Kruger ................. 119/606 |
| 5,159,738 A * | 11/1992 | Sunagawa et al. ........ 15/326 |
| 5,211,131 A * | 5/1993 | Plyler ................. 119/606 |
| 5,462,018 A | 10/1995 | Louison | |
| 5,655,481 A | 8/1997 | Trahan | |
| D389,618 S | 1/1998 | Rosen | |
| 5,768,748 A * | 6/1998 | Silvera et al. .......... 15/402 |
| D444,924 S | 7/2001 | Henning | |
| D444,925 S | 7/2001 | Monette | |
| 6,336,428 B1 | 1/2002 | Locke | |
| 6,345,592 B1 | 2/2002 | Hollis | |
| 7,347,166 B2 | 3/2008 | Roman-Barcelo | |
| 8,205,296 B1 * | 6/2012 | Bissell et al. .......... 15/402 |
| 8,220,109 B2 | 7/2012 | Medema et al. | |
| 8,230,819 B2 | 7/2012 | Freidell | |
| 2002/0092123 A1 * | 7/2002 | Stephens et al. .......... 15/353 |
| 2002/0166512 A1 * | 11/2002 | Corbett ................ 119/611 |
| 2002/0189049 A1 * | 12/2002 | Freidell ................ 15/402 |

* cited by examiner

*Primary Examiner* — Trinh Nguyen
(74) *Attorney, Agent, or Firm* — Rod D. Baker

(57) ABSTRACT

A system for grooming pets, including a vacuum and brushes. A canister containing the motor and vacuum impeller elements is well insulated acoustically. A lengthy, acoustically insulated vacuum hose is provided. A grooming attachment is attachable to the working end of the vacuum hose, the grooming attachment being molded and shaped to minimize the noise of air flowing through the attachment under the action of the vacuum motor. Noise attenuation assembly and baffling assembly are provided nearby and aligned with air input and output ports to direct and smooth air flow to reduce noise output of the system.

18 Claims, 7 Drawing Sheets

QUIET VACUUM SYSTEM FOR GROOMING PETS

CROSS-REFERENCE TO RELATED APPLICATIONS

This application claims priority to and the benefit of the filing of U.S. Provisional Application Ser. No. 61/755,149 entitled "Quiet Vacuum System for Grooming Pets" filed on 22 Jan. 2013, the entire disclosure of which is incorporated herein by reference.

BACKGROUND OF THE INVENTION

1. General Background

Dogs and cats are extremely popular as pets. Millions of pet dogs and cats are cared for by their owners in the USA, and many millions more in other nations of the world.

One aspect of proper pet care is grooming. Some types of long-haired cats, but especially many breeds of dogs, should be properly groomed on a regular basis, or at a minimum have their fur cut and trimmed. Regular grooming, whether or not it is accompanied by haircutting, promotes the health of the pet's hair and skin, as well as maintaining a pleasant-looking pet.

Pets are routinely groomed with known hair and fur scissors and electric clippers. The clipping of fur always generates hair clippings. Also, brushing a pet's coat will remove fur being naturally "shed" from the pet's coat. It is desirable, therefore, to have a way to catch, or clean up, clippings and shed or loose hairs; clippings and shed fur are routinely vacuumed from the floor using a vacuum cleaner. It would be desirable also to be able to brush and vacuum a pet's coat during, or immediately after, cutting and/or brushing the animal's fur. However, ordinary large vacuuming systems, such as those used to vacuum a floor, are difficult to use for vacuuming pets directly due to, among other things, their noisy operation and inconvenient configuration.

2. Background Knowledge in the Art

It is known to have small, completely hand-held, battery-powered pet grooming vacuums. Examples of such known devices are those disclosed in U.S. Pat. No. 4,799,460 to Kuhl, U.S. Pat. No. 5,074,006 to Eremita, U.S. Pat. No. 5,655,481 to Trahan, and U.S. Pat. No. 6,336,428 to Locke. While small hand-held devices may be quieter, they generally provide a relatively weak vacuum and very short battery life. And merely attaching a generic attachment tool on the end of the hose of a conventional high-powered vacuum (i.e., ordinary floor vacuums powered by 110-volt AC electrical current conventionally available in residences and commercial grooming establishments) does not address the problem of the noise of the vacuum, which is known to be disturbing to may pets, making the final vacuuming of the pet's coat more difficult or impossible. Even known grooming tools adapted to be attached to the hoses of conventional non-hand-held canister type vacuum systems fail to address the problem of system noise that frightens pets. Examples of pet grooming tools attachable to ordinary vacuum hoses include the devices seen in U.S. Pat. No. 5,095,853 to Kruger, No. Des. 389,618 to Rosen, No. D444,925 to Monette, and No. 7,347,166 to Roman-Barcelo. Other publication serving as background to the present invention include U.S. Pat. No. 5,462,018 to Louison and No. D444,924 to Henning. The entire disclosures of the patents mentioned in this paragraph are hereby incorporated by reference.

Against the foregoing background, the present invention was developed.

SUMMARY OF THE INVENTION

Disclosure of the Invention

This invention provides a vacuum system that is specially adapted for use in vacuuming a pet's coat during or after grooming, including fur brushing, cutting and trimming.

A primary object of the present invention is to provide a pet vacuuming system that is quiet so as not to increase anxiety in or scare the pet being groomed.

Another object of the present invention is to provide a vacuum system that is portable.

A primary advantage of the present invention is that it has a grooming attachment with a smoothly curved throat to reduce noise generated by the system in the close vicinity of the pet.

Another advantage of the present invention is that the motor and impeller are acoustically insulated to reduce noise levels.

Another advantage of the present system is the provision of an extra-long vacuum hose, so as to permit the canister unit containing the vacuum motor to be located remotely from the pet being groomed.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

The drawings are intended to be diagrammatic only, and are not necessarily to scale either within a particular figure or between figures.

DESCRIPTION OF THE PREFERRED EMBODIMENTS

Best Modes for Carrying Out the Invention

The present invention relates to an apparatus and system for vacuuming a pet's coat while, or after, the pet's fur is cut, brushed or trimmed. The system allows for the pet's coat to be brushed and vacuumed simultaneously, if desired. It is contemplated that the system will find ready beneficial use in professional pet grooming salons, but its use is not so limited. The system may also find utility in the home of a pet owner, as well. The nonprofessional, such as a typical pet owner, may find beneficial use of the invention affordably and simply at home, in lieu of taking her pet to a professional groomer. In this disclosure, "pet" refers to any domesticated mammal whose fur may need grooming from time to time, but particularly includes cats and especially dogs. The terms "fur" and "hair" will be generally interchangeable in this description, but refer to the hair that grows on pets. "Coat" refers to the fur growing on the animal, and "clippings" refers to fur that has been trimmed, brushed, or cut from the animal's coat.

Figure 1:
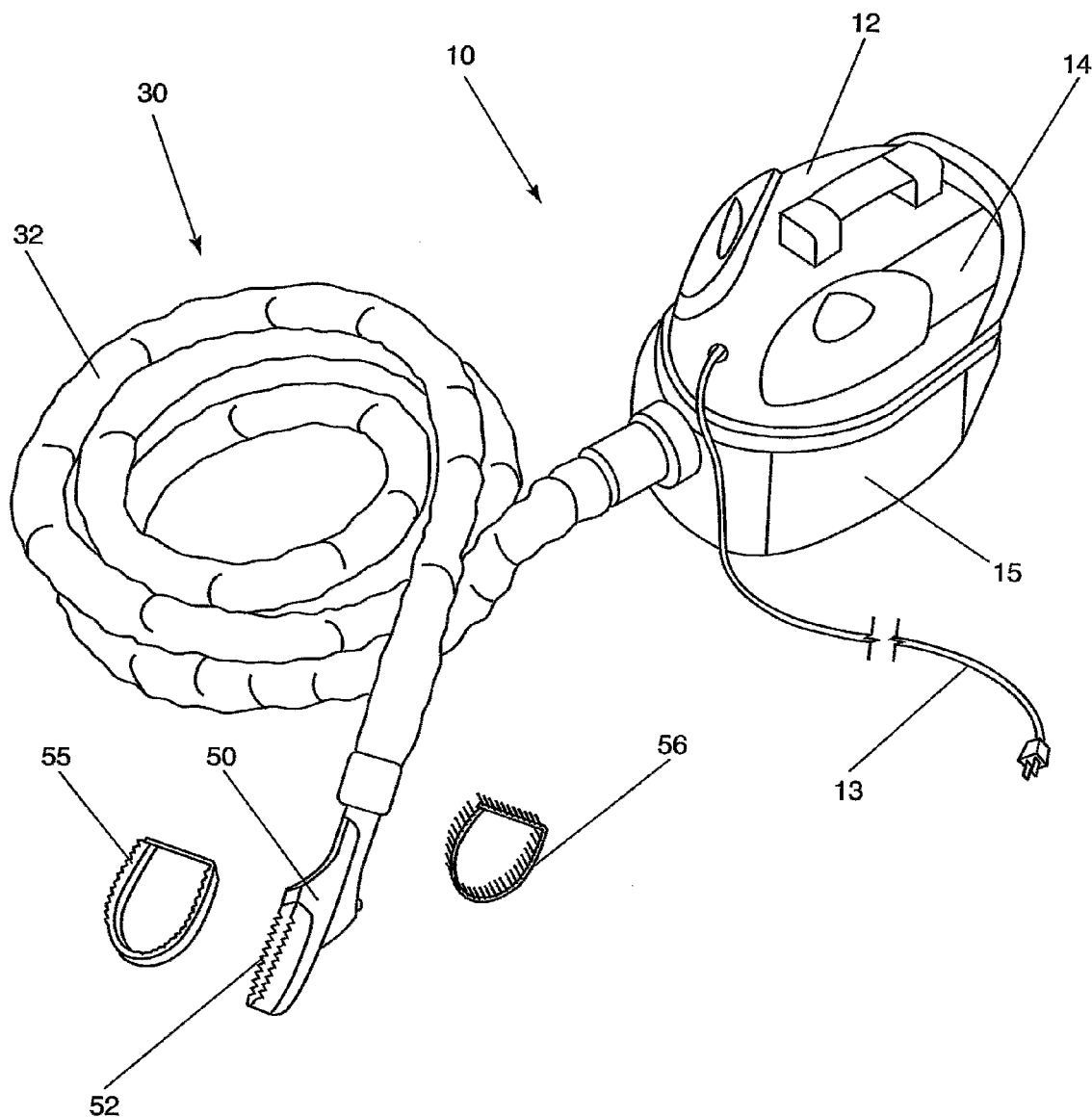
FIG. 1 is a perspective view, from above, of the overall pet vacuum system according to the present disclosure.

Attention is invited to FIG. 1, providing a perspective view of the overall system 10 according to this disclosure. There is seen a specialized vacuum canister unit 12, a vacuum hose 30, and a grooming attachment 50 on the distal end of the hose 30. Overall, the system 10 operates generally in accordance with known AC-powered portable canister vacuum systems long-known in the art of vacuum cleaning devices, subject to the special modifications and improvements described herein after. The canister unit 12 contains an electric motor (not seen in FIG. 1) of suitable power level for generating a vacuumed air flow through the hose 30 at an air flow discharge (cfm) generally known for vacuums of this type. The canister unit 12 housing the motor draws current (e.g., 110V AC) through a cord 13 that plugs into the usual wall outlet. Thus, when the system 10 is in use, items (particularly fur clippings) are pulled by vacuum force into the grooming attachment 50 and from there through the vacuum hose 30 and into the canister unit 12 all according to convention. The canister unit has a top portion 14 that is removably attachable atop the bottom portion 14. Top portion 14 and bottom portion 15 preferably are mating plastic shells that, when sealably engaged together, define the overall housing for the canister unit 12, also as known in the art.

Seen in FIG. 1 are assorted brush attachments 52, 55, 56 that are removably attachable, as by frictional engagement or elastic "clip-on" or the like, to the grooming attachment 50. The interchangeable brush attachments 52, 54, 56 have brush teeth of various and differing lengths, density, composition, etc. as known to allow the user to select and deploy a brush having brushing features adapted to the brushing task at hand. The vacuum hose 30 is similar to those known generally, except that it is longer (e.g. approximately 12 to 20 feet) than those commonly encountered; the hose 30 preferably is at least twelve feet long, so to permit the canister 12 to be located remotely from the grooming attachment 50, and the pet being groomed thus less likely to be frightened by the noise of the motor 17. Further, the vacuum hose 30 preferably is covered throughout at least a majority of its length with a sound-dampening, acoustically insulating cover 32. The cover 32 may be fabricated from cloth or paper fabric, pliable plastic, or the like. In a preferred embodiment, the cover 32 material is composed of, or treated with, an internal or external anti-static agent, so that the cover does not accumulate a static electricity voltage which tends to attract hair clippings and other debris. For example, the cover 32 may be fashioned from a woven fabric treated with a suitable known anti-static agent; internal antistatic agents are mixed directly into the material, external antistatic agents are applied to its surface.

Figures 2A, 2B, 2C:
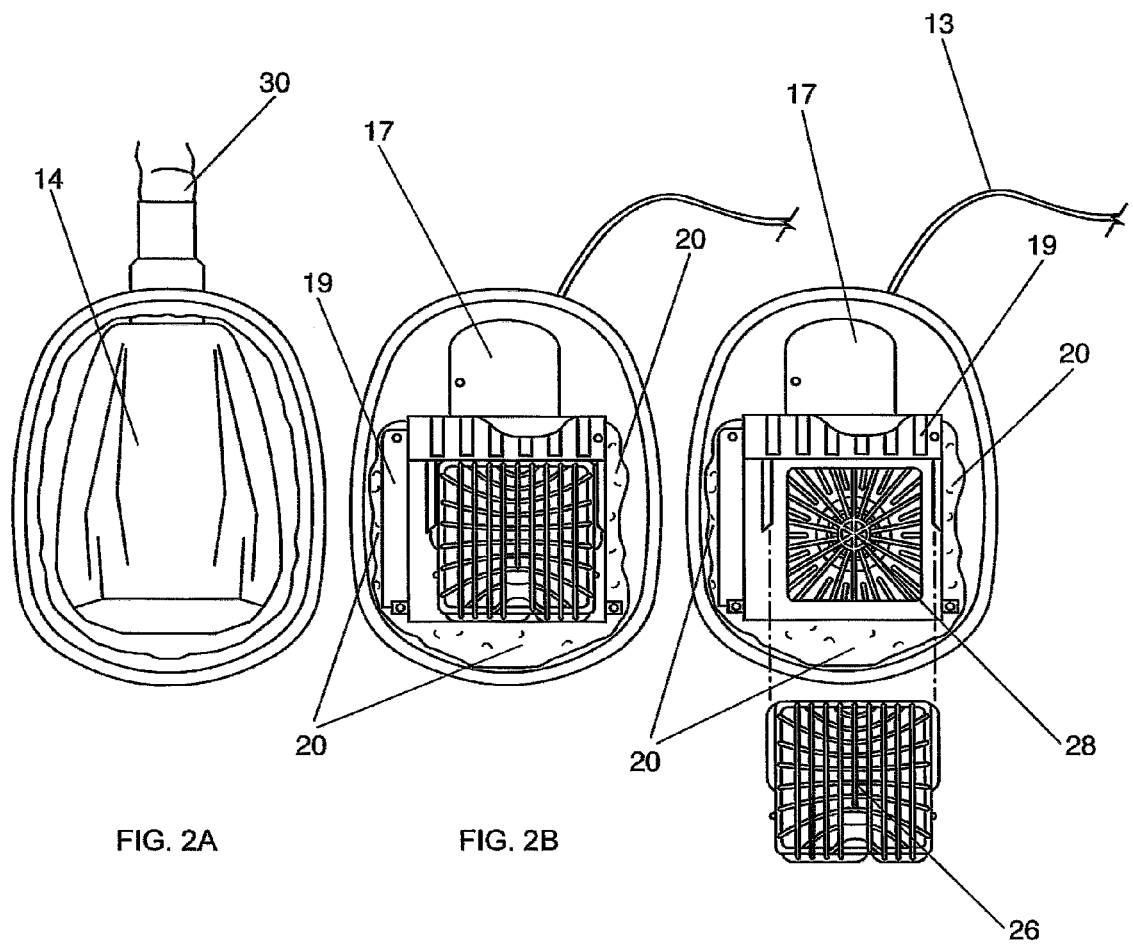
FIG. 2A is a plan top view of an upper portion of the canister unit of the system according to the present disclosure.
FIG. 2B is a bottom view of the top portion of the canister unit removed from the bottom portion of the canister unit, showing selected interior features and components.
FIG. 2C is a partially exploded bottom view of the top portion of the canister unit seen in FIG. 2B, illustrating the removable engagement of a sound attenuator assembly with a vaned baffle covering the intake port of the motor-impeller assembly.

FIG. 2A shows the top portion 14 of the canister unit 12 in position for use. FIG. 2B illustrates a bottom view of the top portion of the canister unit 12 when the top portion 14 is removed from the bottom portion 15 of the canister unit. Stated differently, FIG. 2B depicts the top portion 14 as it would appear when disengaged from the bottom portion and inverted and viewed from above. The bottom portion 15 of the canister unit 12 serves mainly as a container for holding and receiving matter vacuumed up by the vacuum motor; a vented or filtering vacuum bag (not shown) optionally may be contained within the bottom portion 15 when the system is in use.

Combined reference is made to FIGS. 2A-C. Secured within the top portion 14 of the canister unit is the electrically powered vacuum motor 17 for generating the air flow through the canister unit 12 to generate the vacuum effect in the hose 30 in a generally known manner. In prior art vacuum canister systems, the motor is a source of loud noise generated by the function of the stator, rotor, and associated electrical brush connections, as well as the rotational operation of the impeller/fan connected to the motor shaft. In the system according to this disclosure, there is disposed around the impeller assembly housing 19 (but inside the exterior shell of the top portion 14) a layer of acoustic insulation 20 to muffle the sound generated by the operation of the impeller and the flow of air through it. In one preferred embodiment, the layer of acoustic insulation 20 covers the impeller housing on at least three sides (as seen in FIGS. 2A and 2B). The acoustic insulation 20 on the outside of the assembly housing 19 covers as much of the housing as practicable. The insulation 20 preferably (but not necessarily) is a known urethane or polyurethane type foam that is sprayed into place in a viscous state, and then hardens into a firm closed cell foam layer to absorb sound effectively.

Also seen in FIGS. 2B and 2C are a sound attenuator assembly 26. The attenuator assembly 26 includes a rigid support which mounts thereon a sheet or layer of acoustical insulation, such as a fiberfill or unwoven natural fiber pad, or a sheet of sound-absorbing polymeric foam (e.g., urethane). As seen in FIG. 2C, the attenuator assembly 26 is removably attachable adjacent to the intake port 28 of the vacuum impeller assembly. The attenuator assembly 26 has a sliding engagement with complementary flanges on the impeller assembly housing 19. The attenuator assembly 26, which may secondarily act as a filter catching finer material (such as pet dander or soil particulates) in the air entering the impeller, accordingly is easily removed and replaced, allowing for frequent and convenient changing of the sound-absorbing pad or layer. The rigid support for the insulation is plastic in composition and re-usable.

Figure 5:
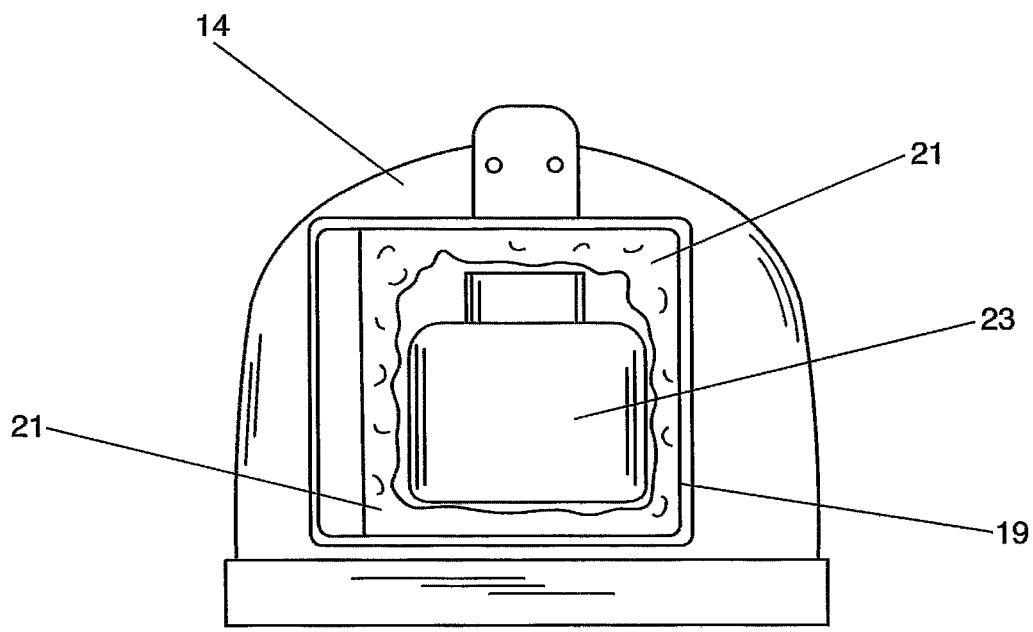
FIG. 5 is an end view of the top portion of the canister unit of the system, with a portion broken away to expose selected interior features.

Attention is invited to FIG. 5, an end view of the top portion 14 of the present system, with a portion broken away to reveal internal features of the invention. The vacuum impeller is within a casing 23 situated within the impeller assembly housing 19 according to general convention. However, in the present system, a fibrous or foam acoustic insulation 21 (for example, fiberglass or similar lofted "batting") is provided between the impeller casing 23 and the surrounding housing 19. The insulation is disposed so as substantially to surround as much of the impeller casing 23 a practicable. The provision of abundant insulation 21 in the space within the housing 19 and around the casing 23 (and optionally a portion of the motor 17) muffles effectively much of the noise generated by the motor and impeller. The overall vacuum system 10 of this disclosure accordingly is substantially quieter and less disturbing to pets.

Figure 3:
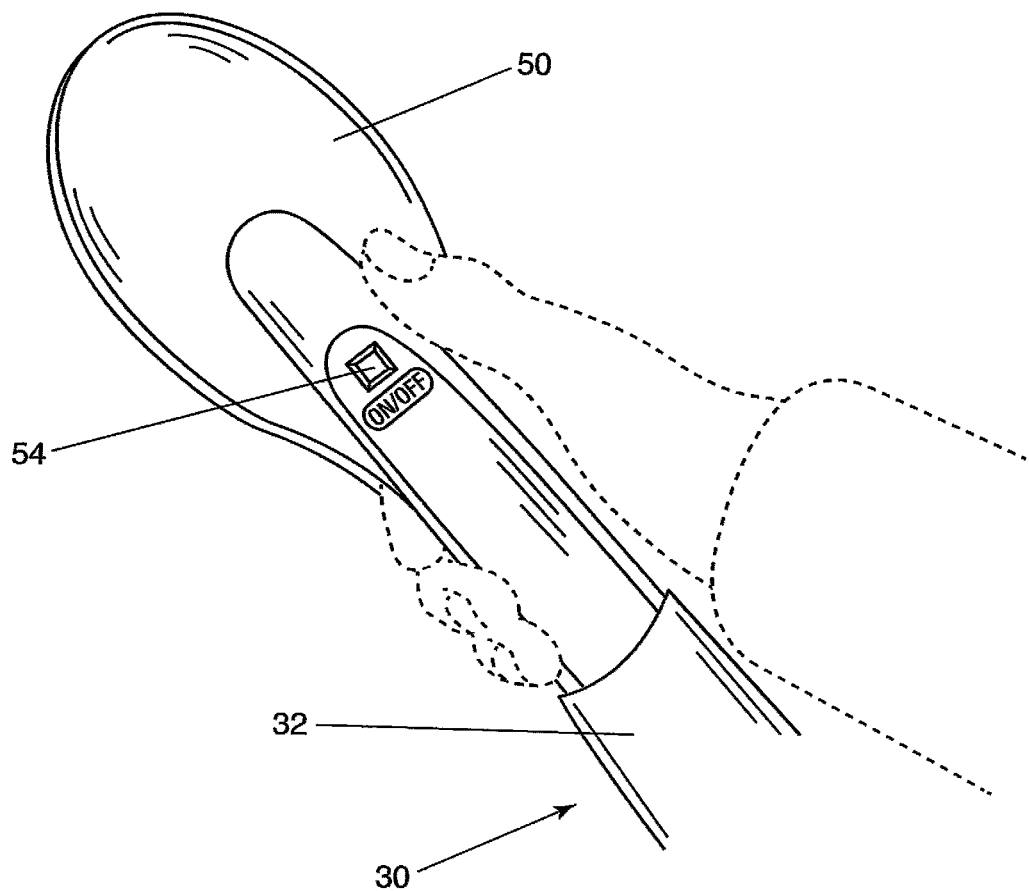
FIG. 3 is an enlarged perspective view of the top of the grooming attachment component of the vacuum system according to the present disclosure.

A desirable feature of the presently disclosed system is shown in FIG. 3. The main on/off switch 54 for the vacuum motor 17 is located on the grooming attachment 50 at the distal or "working" end of the vacuum hose 30 and is in signal communication with the vacuum motor 17. Electrical wiring running between the on/off switch 54 and the vacuum motor 17 inside the canister unit 12 complete the operational control circuit for the motor. Normally, a well-insulated wire (not seen in the drawing, but readily understood) is disposed along the vacuum hose 30; it may be outside the hose 30 but inside the acoustically insulating hose cover 32. Such a wire would run from the motor on-off switch 54 along the vacuum hose and then enter into the casing for the motor 17 for electrical connection therewith. Thus the user need not be near the canister unit 12 in order to turn the vacuum motor on or off. This permits the user to operate the system even though the canister unit 12 is located a considerable distance from the user and the pet. (With a sufficiently long hose 30 and control circuit wiring, the canister 12 may even be in an adjacent room during use.) The vacuum motor 17 and the sound it generates during operation accordingly can be located remotely from, or even isolated from, the pet being groomed, thus reducing the opportunity for the motor's sound to frighten the pet.

Figure 4:
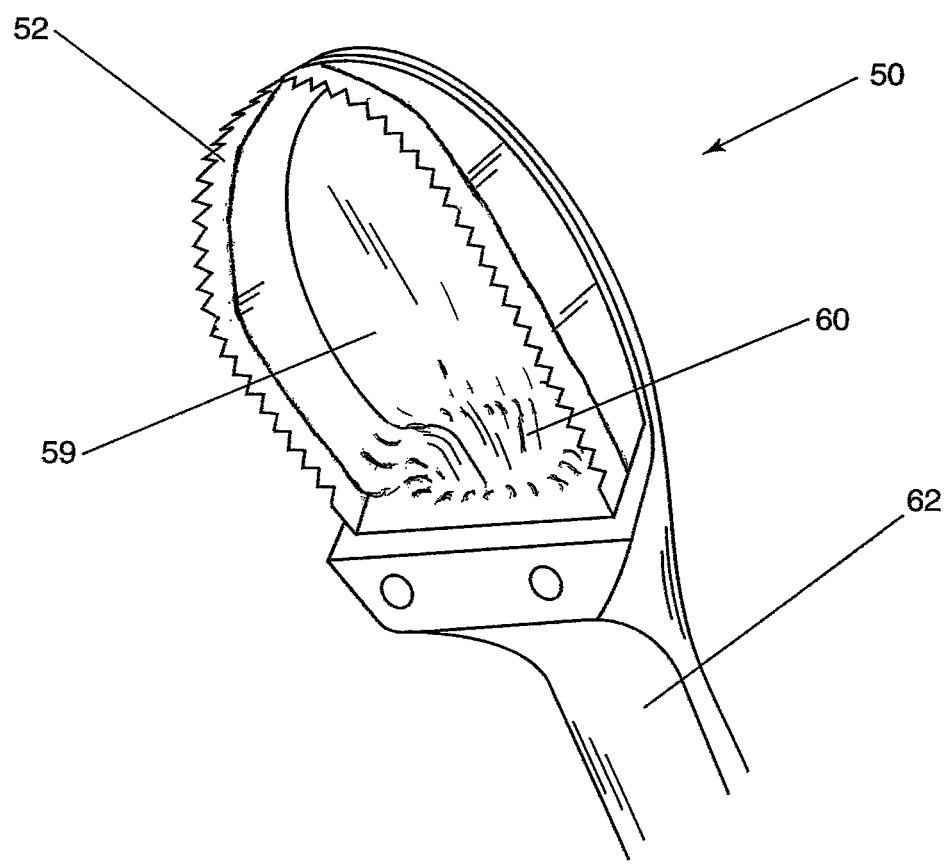
FIG. 4 is an enlarged perspective view of the bottom of the grooming attachment component of the vacuum system according to the present disclosure.

Features of the grooming attachment 50 are shown in FIG. 4. The grooming attachment 50 is connected to the distal end of the vacuum hose 30 in any suitable manner. It is seen that the grooming attachment 50 has a body configured to permit a grooming brush 52 to be releasably attached thereto. The brush 52 is detachable and re-attachable, so that a variety of brushes 52 having different grooming characteristics can be interchangeably used upon the grooming attachment 50. Attachment of the brush 52 may be by frictional engagement, or clip-on, or by having the brush be elastically resilient to snap into place, or the like. The teeth of the assorted different brushes can have differing bristle lengths, and/or stiffness, different numbers or configurations of bristles or teeth, etc. as known for accomplishing various grooming tasks.

It has been determined that in known vacuum systems featuring attachments/tools at the end of a vacuum hose, a great deal of sound energy is generated by the flow of air through the attachment tool. The sound, which can be sufficiently loud as to qualify as "noise," is caused by turbulence in the air flow through the attachment, particularly as the air flows from the attachment into the vacuum hose. The interior throats of many known attachments have abrupt changes in diameter, relatively sharp corners, irregular contours, etc., that interrupt smooth air flow. Air flow pulled into the attachment by the action of the vacuum motor is disturbed and/or rapidly constricted inside the attachment, or as flowing from within the attachment into the distal end of the vacuum hose. Consequently, air flow through the attachment and into the vacuum hose is turbulent, resulting in comparatively high noise levels generated at the attachment itself. This is problematic when the attachment is being used to groom a pet; a pet otherwise nervous about being groomed can be terrified by a nearby noisy attachment on a vacuum system.

The present system ameliorates the foregoing problem of noisy attachments. A premier feature of the grooming attachment 50 according the invention is the provision of its smoothly contoured interior and throat. Referring to FIG. 4, the attachment mouth 59 has no abrupt changes in interior contour to upset smooth airflow, but rather has a broad, smoothly concave interior surface, for quiet airflow. The attachment's throat 60 serves as the transition for airflow from the broad mouth 59 into the vacuum hose attached to the neck 62 of the attachment 50. The throat 60 has a gently curved funnel-like contour. The throat's gradually decreasing interior diameter promotes smooth airflow and reduces turbulence as the air transitions from the mouth 59 through the neck 62 and into the distal end of the vacuum hose, when the vacuum hose (distal end thereof) is attached to the attachment neck. Thus, the grooming attachment 50 may be fabricated such that its interior mouth 59, throat 60, and neck 62 are integrally molded as a single unit, e.g., of plastic or polymer, such that the interior contours of the mouth and throat present continuous transitional curves lacking sharp edges or corners, put progress smoothly from the mouth toward the neck to funnel flowing air toward the reduced interior diameter of the tube-like neck 62. Consequently, the grooming attachment 50 is quieter in operation than known vacuum tool attachments. Pets being vacuumed using the attachment 50 are calmer, and the grooming of the coat is accomplished faster and more easily.

Figures 6A, 6B:
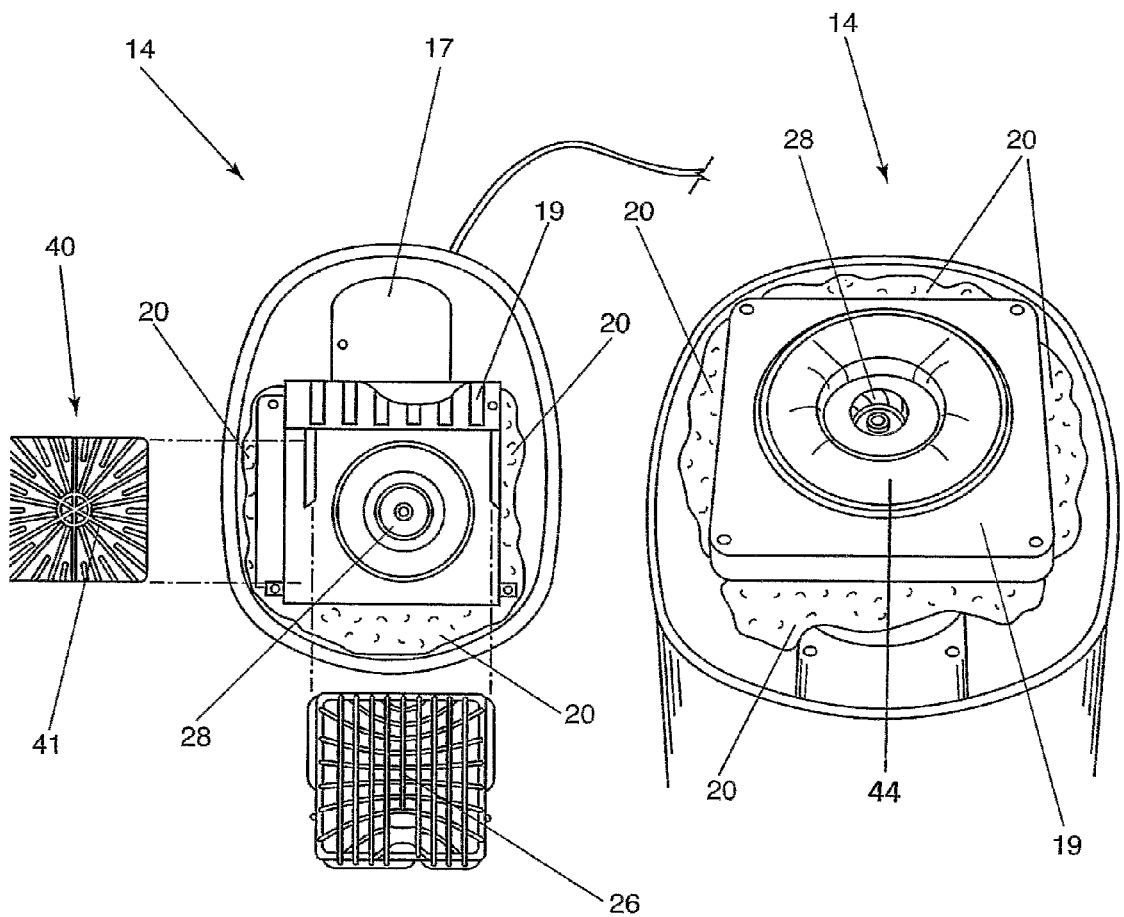
FIG. 6A is a bottom view of the top portion of the canister unit, removed from the bottom portion, further partially exploded to show certain components and features of the system.
FIG. 6B is a perspective bottom view of the top portion seen in FIG. 6A, enlarged to show certain features associated with the intake port.

Reference is made to FIG. 6A, a view of the underside of the top portion 14 of the canister, illustrating features of the invention associated with the intake port 28 of the vacuum motor and impeller assembly. The intake port 28 is the intake for air that is drawn by the motor and impeller assembly by the rotary action of that assembly. The intake air enters the intake port 28 at comparatively high velocities, and thus elevated sound volume. Accordingly, there is provided a semi-rigid (e.g. plastic) vaned baffle 40 in axial alignment with the intake port 28. The baffle has a plurality of vanes 41 directed radially inward toward the center of the intake port 28 as depicted in FIG. 6A. The vanes 41 are centrally registered with the air flow into the port 28, and serve to direct the airflow to reduce turbulence in the air flow, thereby reducing noise levels. The attenuation assembly 26 is then removably engagable over the baffle 40 so to filter the air entering the motor-impeller assembly from the lower portion 15 of the canister unit 12.

Combined reference is made to FIGS. 6A and 6B. FIG. 6B offers a relatively enlarged perspective view of the intake port 28 of the motor-impeller assembly. Foam acoustic insulation 20 is provided liberally around the outside of the housing 19 to muffle sounds generated by the motor and impeller. The intake port 28 is provided circumferentially with a gently concave surround 44. The surround 44 is fashioned from smooth plastic, and has a mild funnel shape so as to direct smoothly and with reduced turbulence the intake air entering the port 28. The air flow enters the port 28 more quietly and is better directed across the vaned baffle 40 and from the sound suppressing attenuator assembly 26.

Figure 7:
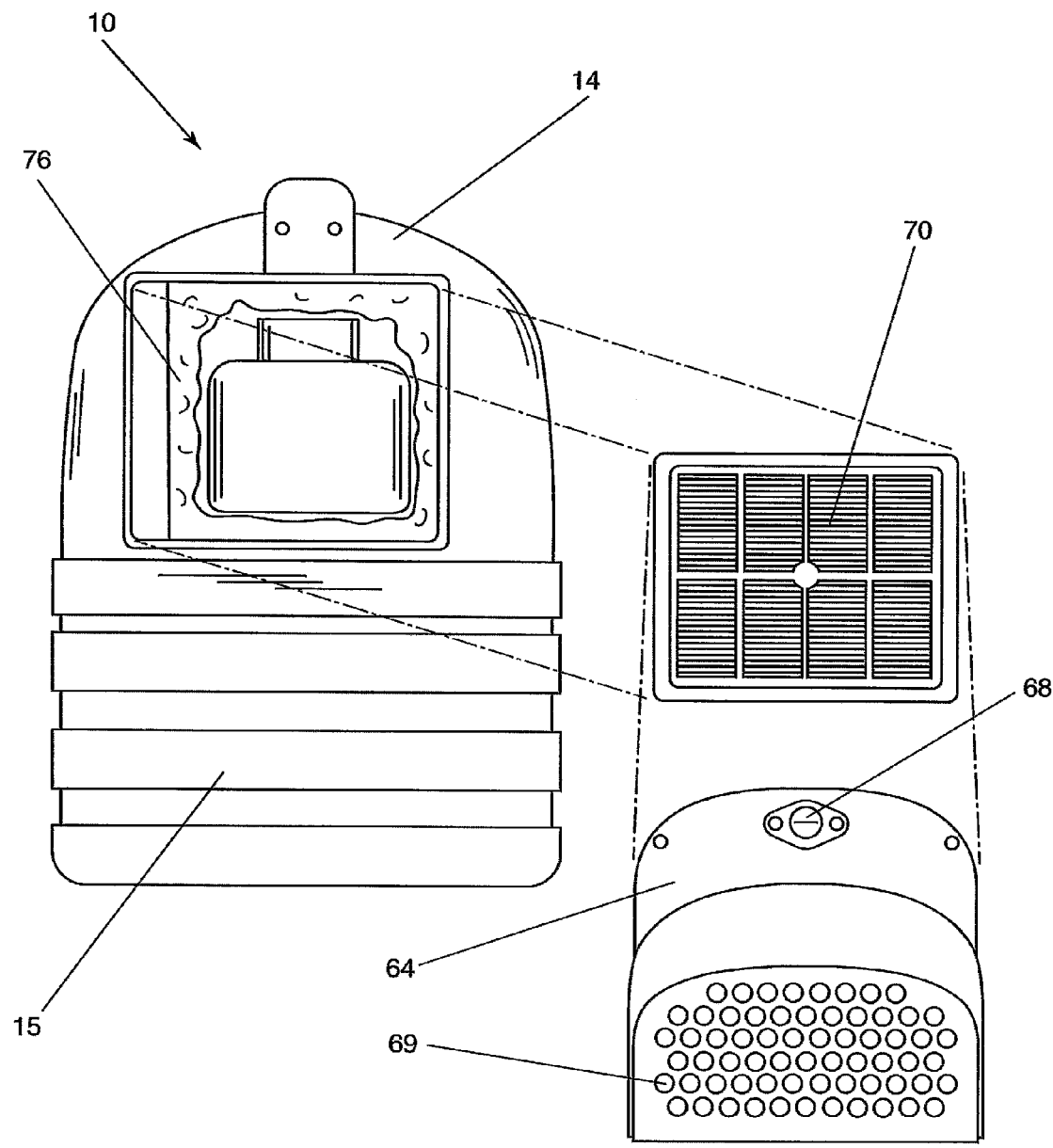
FIG. 7 is a partially exploded rear view of the apparatus, showing selected components associated with the exhaust port, including a HEPA filter.

Attention is now invited to FIG. 7, depicting another advantageous aspect of the invention. FIG. 7 depicts a rear view of the overall apparatus, with selected parts removed. The impeller housing 19 is visible in the interior of the top portion 14 of the canister, and in operation air is expelled there from toward the exhaust port 69 in the exhaust port cover 64. The exhaust port cover 64 in FIG. 7 is seen temporarily detached from the top portion 14 to expose the short passageway through which exhaust air exits the vacuum canister. Seen at the rear of the system 10, at the end opposite from where the hose 30 enters the canister 12, there is a HEPA filter system provided at the exhaust port of the system. The exhaust from the system is expelled there from via exhaust ports 69 in an exhaust port cover 64. The exhaust port cover 64 is removably and generally sealably connectable to the rear of the top portion 14 of the canister. A latch 68 may be provided for disengaging the cover 64 from the body of the top portion 14. Air expelled by the rotary action of the impeller exits the system though the exhaust ports 69 in the port cover 64. In a preferred embodiment, additional acoustic insulation (not shown), such as urethane foam padding or fiberfill, is disposed loosely within the interior space of the exhaust port cover 64 to further dampen the system's exhaust noise.

Advantageously, the exhaust port is provided with a HEPA filter 70. The HEPA filter 70 is composed of materials generally known in the provision of such filters. When the system 10 is in use, the HEPA filter 70 is held in place between the exhaust port cover 64 and the upper portion 14 if the canister, in place against the latter where the air exist there-from toward the exhaust port 69. The filter 70 may be held in place by being slipped between a pair of correspondingly spaced guide rails, or clipped in place, or by other suitable mode of attachment, including a rigid support mount similar to that employed in connection with the attenuation assembly 26 described hereinabove. Accordingly, air exiting the apparatus of the system is filtered by the exhaust HEPA filter 70, preventing deleterious particles, especially pet dander, from being expelled back into the ambient air of the room where the apparatus is used.

Also seen in FIG. 7 is additional acoustical insulation disposed in and around the exhaust port. The abbreviated duct in the upper canister portion 14, seen in open section at the left portion of FIG. 7, passes exhaust air flow from the outlet of the impeller to the exhaust port 69. As seen in the figure, the duct is entirely surrounded, around its exterior surfaces, by sound-absorbing material 76. The insulation 76 may be of any suitable material composition which readily absorbs acoustic energy. For example, it may be a porous layer of non-woven synthetic fibers, or of fiberglass fibers, or similar lofted "batting" like material. The acoustic material 76 alternatively could be a urethane or polyurethane foam or the like. In all embodiments, the flow path of the exhaust air, between the fan impeller outlet and the exhaust port on the exterior of the canister 12, is substantially surrounded by such acoustical insulation, so as to dampen the sound of the motor and airflow of the vacuum motor. The result is, again, an advantageously quite pet grooming vacuum that is less likely to upset a pet during grooming.

There is disclosed therefore a vacuum system 10 for grooming pets that features a vacuum canister unit having a vacuum motor 17 and a vacuum impeller assembly. The impeller assembly includes an impeller casing 23, an assembly housing 19 at least partially surrounding the impeller casing, a first acoustic insulation 21 between the impeller casing and the assembly housing, and an intake port 28. The system 10 has a vacuum hose 30 having a first end in fluid communication with the impeller assembly via the housing 19. A grooming attachment 50 is attachable, preferably removably attachable, upon a distal end of the vacuum hose 30.

The on/off switch 54 for turning on and off the vacuum motor 17 is located on the grooming attachment 50 and in signal communication, as by a control circuit wiring, with the vacuum motor. A sound attenuator assembly 26 preferably is removably attachable nearby or adjacent to the intake port 28 for the impeller. The attenuator assembly includes rigid or semi-rigid support, such as a plastic matrix member, mounting thereon a layer of acoustical insulation.

A second acoustic insulation 20 is disposed on the assembly housing to cover well the housing, for example on at least three sides of the housing. The first and second acoustic insulations preferably are a material selected from the group consisting of fibrous lofted batting (e.g. fiberglass), urethane foams, and polyurethane foams.

The vacuum hose 30 preferably is at least twelve feet long, such that the grooming attachment 50 when on the distal end of the hose can be in a different room from where the canister unit 12 is located during the operation of the system to groom a pet. The vacuum hose is covered along at least a majority of its length with an acoustically insulating cover 32, which may be a woven fabric treated with an anti-static agent.

There is a concave surround 44 disposed circumferentially around the intake port 28 and which defines a generally funnel shape to direct smoothly the air entering the intake port. In a preferred embodiment, there is a baffle 40 in substantially axial alignment with the intake port 28, the baffle having a plurality of vanes 41 directed radially inward toward the center of the intake port, thereby to direct airflow to the center of the intake port. The sound attenuation assembly 26 is removably engagable over the baffle 40, the baffle thus is between the intake port and the attenuation assembly. The grooming attachment 50 preferably has a mouth portion 59 defining a broadly concave interior surface having no abrupt changes in contour, an attachment neck 62, a throat 60 having a decreasing interior diameter defining a curved funnel-like contour serving as a transition for airflow from the grooming attachment mouth into the vacuum hose which is attached to the attachment neck 62.

Although the invention has been described in detail with particular reference to these preferred embodiments, other embodiments can achieve the same results. Variations and modifications of the present invention will be obvious to those skilled in the art and it is intended to cover in the appended claims herewith all such modifications and equivalents.

I claim:

1. A vacuum system for grooming pets comprising:
 a vacuum canister unit comprising a vacuum motor and a vacuum impeller assembly comprising:
  an impeller casing;
  an assembly housing at least partially surrounding the impeller casing;
  first acoustic insulation between the impeller casing and the assembly housing; and
  an intake port;
 a vacuum hose having a first end in fluid communication with the impeller assembly;
 a grooming attachment attachable upon a distal end of the vacuum hose;
 an on/off switch located on the grooming attachment and in signal communication with the vacuum motor;
 a sound attenuator assembly removably attachable adjacent to the intake port, the attenuator assembly comprising a rigid support mounting thereon a layer of acoustical insulation; and a concave surround disposed circumferentially around the intake port and defining a generally funnel shape to direct air entering the intake port.

2. The system of claim 1 further comprising second acoustic insulation disposed on the assembly housing to cover the housing on at least three sides.

3. The system of claim 2 wherein the first and second acoustic insulations comprise a material selected from the group consisting of fibrous lofted batting, urethane foams, and polyurethane foams.

4. The system of claim 1 wherein the vacuum hose is at least twelve feet long.

5. The system of claim 1 wherein the vacuum hose is covered along at least a majority of its length with an acoustically insulating cover.

6. The system of claim 5 wherein the insulating cover comprises a woven fabric treated with an anti-static agent.

7. The system of claim 1 further comprising a baffle in axial alignment with the intake port, the baffle comprising a plurality of vanes directed radially inward toward the center of the intake port to direct airflow to the center of the intake port.

8. The system of claim 7 wherein the attenuation assembly is removably engagable over the baffle.

9. The system of claim 1 wherein the grooming attachment comprises:
a mouth defining a concave interior surface having no abrupt changes in contour;
an attachment neck; and
a throat having a decreasing interior diameter defining a curved funnel-like contour serving as a transition for airflow from the mouth into the vacuum hose attached to the attachment neck.

10. The system according to claim 1 wherein the canister unit further comprises:
a duct passing exhaust air from the impeller assembly to an exhaust port; and
sound-absorbing material surrounding exterior surfaces of the duct.

11. A vacuum system for grooming pets comprising:
a vacuum canister unit comprising a vacuum motor and a vacuum impeller assembly comprising:
an impeller casing;
an assembly housing at least partially surrounding the impeller casing;
first acoustic insulation disposed between the impeller casing and the assembly housing; and
an intake port;
a vacuum hose having a first end connectable to the canister unit and in fluid communication with the impeller assembly;
a grooming attachment attachable upon a distal end of the vacuum hose remotely from the canister unit;
an on/off switch located on the grooming attachment and in signal communication with the vacuum motor;
a sound attenuator assembly removably attachable adjacent to the intake port, the attenuator assembly comprising a rigid support mounting thereon a layer of acoustical insulation;
a concave surround disposed circumferentially around the intake port and defining a generally funnel shape to direct air entering the intake port; and
a baffle in axial alignment with the intake port, the baffle comprising a plurality of vanes directed radially inward toward the center of the intake port to direct airflow to the center of the intake port.

12. The system of claim 11 further comprising second acoustic insulation disposed on the assembly housing to cover the housing on at least three sides.

13. The system of claim 11 wherein the first acoustic insulation comprises a fibrous lofted batting.

14. The system of claim 12 wherein the second acoustic insulation comprises a urethane or polyurethane foam.

15. The system of claim 11 wherein the vacuum hose is covered along at least a majority of its length with a woven fabric treated with an anti-static agent.

16. The system of claim 11 further comprising a baffle aligned with the intake port, the baffle having vanes directed toward the center of the intake port.

17. The system of claim 7 wherein the attenuation assembly is removably engagable over the baffle.

18. A vacuum system for grooming pets comprising:
a vacuum canister unit comprising a 110-volt AC vacuum motor and a vacuum impeller assembly comprising:
an impeller casing;
an assembly housing at least partially surrounding the impeller casing;
first acoustic insulation between the impeller casing and the assembly housing;
second acoustic insulation disposed on the assembly housing to cover the housing on at least three sides; and
an intake port;
a vacuum hose having a first end connectable to the canister unit and in fluid communication with the impeller assembly;
a grooming attachment attachable upon a distal end of the vacuum hose remotely from the canister unit;
an electrical on/off switch located on the grooming attachment and in signal communication with the vacuum motor for turning on and off the motor remotely;
a sound attenuator assembly removably attachable adjacent to the intake port, the attenuator assembly comprising a rigid support mounting thereon a layer of acoustical insulation;
a baffle in axial alignment with the intake port, the baffle comprising a plurality of vanes directed radially inward toward the center of the intake port to direct airflow to the center of the intake port;
an assortment of brush attachments removably attachable to the grooming attachment;
wherein the vacuum hose is covered along at least a majority of its length with an acoustically insulating cover treated with an anti-static agent, and wherein further the attenuation assembly is removably engagable over the baffle; and a concave surround disposed circumferentially around the intake port and defining a generally funnel shape to direct air entering the intake port.

* * * * *